United States Patent
Cheng et al.

(10) Patent No.: US 7,315,851 B2
(45) Date of Patent: Jan. 1, 2008

(54) METHODS FOR CREATING CONTROL CHARTS USING A COMPUTER SYSTEM

(75) Inventors: Lai Meng Cheng, Hsinchu (TW); Sheng-Chi Chou, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 549 days.

(21) Appl. No.: 10/626,999

(22) Filed: Jul. 25, 2003

(65) Prior Publication Data
US 2005/0021534 A1    Jan. 27, 2005

(51) Int. Cl.
*G06F 17/30* (2006.01)

(52) U.S. Cl. .................. 707/3; 707/100; 707/101; 707/102; 707/103 R; 707/104.1

(58) Field of Classification Search ............ 707/103 R, 707/1–10, 100–104.1, 200–205; 438/5; 700/90
See application file for complete search history.

(56) References Cited

U.S. PATENT DOCUMENTS

| | | | |
|---|---|---|---|
| 5,761,064 A * | 6/1998 | La et al. ..................... | 700/110 |
| 6,643,661 B2 * | 11/2003 | Polizzi et al. ............... | 707/100 |
| 6,646,660 B1 * | 11/2003 | Patty .......................... | 700/108 |
| 6,727,106 B1 * | 4/2004 | Ankutse et al. ............. | 438/5 |
| 6,768,994 B1 * | 7/2004 | Howard et al. .............. | 707/10 |
| 6,839,713 B1 * | 1/2005 | Shi et al. .................... | 707/101 |
| 6,917,841 B2 * | 7/2005 | Conchieri et al. ........... | 700/95 |
| 6,965,895 B2 * | 11/2005 | Smith et al. ................. | 707/10 |
| 7,072,899 B2 * | 7/2006 | Lokken ....................... | 707/101 |
| 2003/0069795 A1 * | 4/2003 | Boyd et al. .................. | 705/22 |
| 2003/0150908 A1 * | 8/2003 | Pokorny et al. ............. | 235/375 |

* cited by examiner

*Primary Examiner*—Mohammad Ali
*Assistant Examiner*—Fred I Ehichioya
(74) *Attorney, Agent, or Firm*—Stout, Uxa, Buyan & Mullins, LLP

(57) ABSTRACT

A method is disclosed for creating a new control chart in a basic record system that includes a server and a database coupled to the server. The method includes the steps of storing a number of SPC control charts and a number of tables in the database and determining whether information stored in at least one of the tables has changed. If the information has changed, the method then determines whether the changed information can be described by at least one of the SPC control charts. If the changed information can be described, then the method updates at least one of the SPC control charts with the changed information. If the changed information cannot be described, then the method creates a new control chart that can describe the changed information.

19 Claims, 4 Drawing Sheets

CONTROL CHART FACTORS = | TOOL | + | RECIPE | + | M_FLD | + | M_ITEM |

| TOOL1 | RECIPE1 | M_FLD1 | M_ITEM1 |
| TOOL2 | RECIPE2 | M_FLD2 | M_ITEM2 |
| TOOL3 | RECIPE3 |        | M_ITEM3 |
|       | RECIPE4 |        | M_ITEM4 |
|       | RECIPE5 |        | M_ITEM5 |
|       |         |        | M_ITEM6 |

Total Combinations = 3 × 5 × 2 × 6 = 180

New Combinations = 3 × 1 × 2 × 6 = 36

FIG. 4

METHODS FOR CREATING CONTROL CHARTS USING A COMPUTER SYSTEM

BACKGROUND OF THE INVENTION

1. Field of the Invention

The present invention relates generally to statistical process control and, more particularly, to methods for creating control charts using a computer system.

2. Description of the Related Art

With the increase in complexity and longer cycle times of modem IC production, maintaining high quality production lines with high yields even through variations in fabrication is a constant challenge. In general, the average cycle time to complete an IC is a number of months, with many tools and materials being involved in the process. With current CIM frameworks for IC fabrication, SPC and ALARM mechanisms are necessary components for properly monitoring the myriad of processes and tools. Such mechanisms act to notify engineers and operators that some predefined condition or conditions have occurred and take predefined actions to limit the impact of the event. Hopefully the event can be completely solved and/or fixed before actual damage has occurred. In a single mass production FAB, hundreds of different products might be concurrently processed with hundreds of different tools being utilized. Keeping track of the detailed status for each product and each tool requires considerable effort to setup, especially for a product mix.

With reference to FIG. 1, a computer system 100 typically includes a main computer ("server") 102 in which one or more databases 104 are located, one or more remote computers ("clients") 106, and a network 108, which provides the communication means between the clients 106 and the server 102. Information, e.g. data, is typically maintained in the databases 104 or storage devices such as random-access memory, hard drives, tape drives, and the like, and is managed by database management software. The information can be stored as a data record in a database table. The server 102 typically includes the database management software, which controls access to and modification of the information under its control. The server 102 can be a personal computer or a mainframe computer with a processing unit 109 having commercially available or specifically designed database management software. Examples of commercially available database management software include DB2 from IBM Corporation and Oracle7 from Oracle Corporation.

The clients 106 are typically hand-held devices, personal computers, workstations, or other kinds of computer monitors or terminals. Preferably, the clients 106 are IBM compatible computers. Each of the clients 106 can include a processing unit 110 having a CD-ROM drive 112 for loading CD-ROM disks 114, a monitor 116, a keyboard 118, and a mouse 120. Also, the clients 106 can each have separate storage devices 122, which are usually smaller than the server's storage device 104. The clients' storage devices 122 are generally made up of a combination of a random-access memory and a hard drive. The clients 106 can be either remote from the server 102 or collocated with the server 102.

The clients 106 typically include applications such as word processors, spreadsheets, electronic mail, and database interface software that communicate with the server 102 to access information in the database 104, to update information in the database 104, and to add new information to the database 104. Quite often, when a user of the application needs information, the application contacts or queries the database 104 to find and retrieve the desired information for use in the application.

Statistical process control (SPC) is a methodology or procedure for monitoring the degree of variation between production runs. SPC is commonly used in industry and manufacturing in general, and more specifically in the field of semiconductor manufacturing. Data is collected on a continual basis and sorted into a collection of charts and tables to more easily monitor individual processes. When data is taken which varies from the previous production runs an alarm may be set off which warns of a process violation. Various rules can be set up to monitor the data that is entered onto process control charts. Once the control chart has been set up and rules have been applied to the chart, the chart can be linked to a particular tool, process, procedure, etc. for monitoring purposes.

Many applications are currently available and are used for creating, displaying and printing charts and tables. Generally, an operator or user of the clients 106 creates the charts and tables. Manually creating the charts and tables for SPC can be both tedious and prone to error. Furthermore, the operator or user may avoid or miss creating a chart or table as a result of, for example, forgetting that new data has been received at the clients 106 or the server 102 or not knowing that a new chart or table needs to be created. Therefore, there exists in the art a need for a more streamlined and integrated link between manufacturing execution systems (MES) and statistical process control (SPC).

SUMMARY OF THE INVENTION

One embodiment of the present invention is a method for creating a new control chart in a basic record system that includes a server and a database coupled to the server. The method includes the steps of storing a plurality of SPC control charts and a plurality of tables in the database and determining if information stored in at least one of the plurality of tables has changed. If the information has changed, then the method determines whether the changed information can be described by at least one of the plurality of SPC control charts. If the changed information can be described, then the method updates the at least one of the plurality of SPC control charts with the changed information. If the changed information cannot be described, then a new control chart is created which can describe the changed information.

Another embodiment of the present invention is a method for creating a new control chart using a server, which is coupled to a database that stores a plurality of SPC control charts and a plurality of tables. The method includes the steps of monitoring the plurality of tables to determine if information within the tables has changed, and determining if the changed information can be described by at least one of the plurality of SPC control charts. If the changed information can be described, then at least one of the plurality of SPC control charts is updated with the changed information. If the changed information cannot be described, then a new chart is created.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 4 is a simplified chart that illustrates possible control charts based on key SPC factors.

DETAILED DESCRIPTION OF THE PRESENTLY PREFERRED EMBODIMENTS

Figure 1:
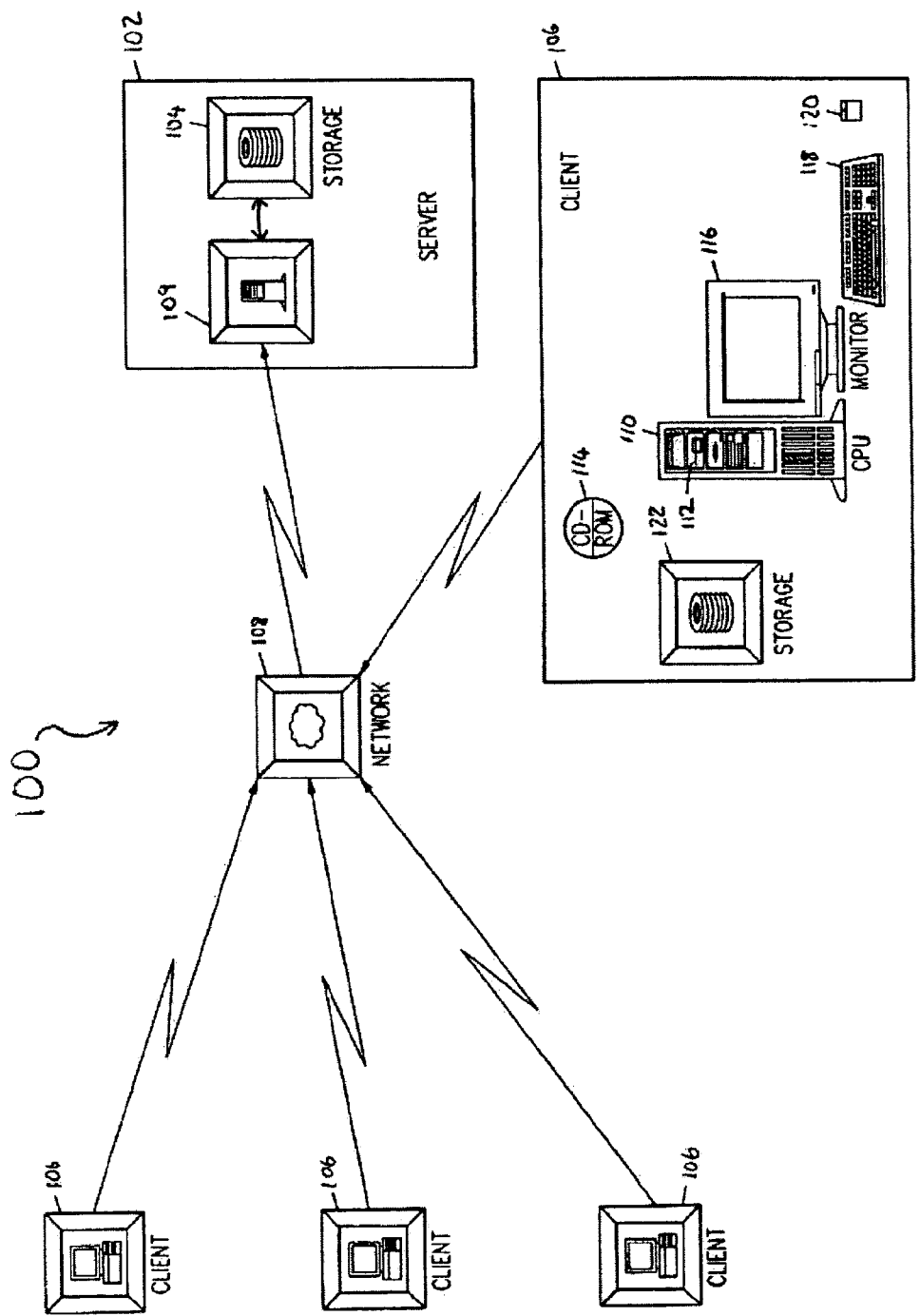
FIG. 1 is a simplified block diagram of a prior art client-server computer system having a server and multiple clients.

Reference will now be made in detail to the presently preferred embodiments of the invention, examples of which are illustrated in the accompanying drawings. Wherever possible, the same or similar reference numbers are used in the drawings and the description to refer to the same or like parts. It should be noted that the drawings are in simplified form and are not to precise scale.

In reference to the disclosure herein, for purposes of convenience and clarity only, directional terms, such as, top, bottom, left, right, up, down, over, above, below, beneath, rear, and front, are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of the following detailed description, although discussing exemplary embodiments, is to be construed to cover all modifications, alternatives, and equivalents of the embodiments as may fall within the spirit and scope of the invention as defined by the appended claims.

Figure 2:
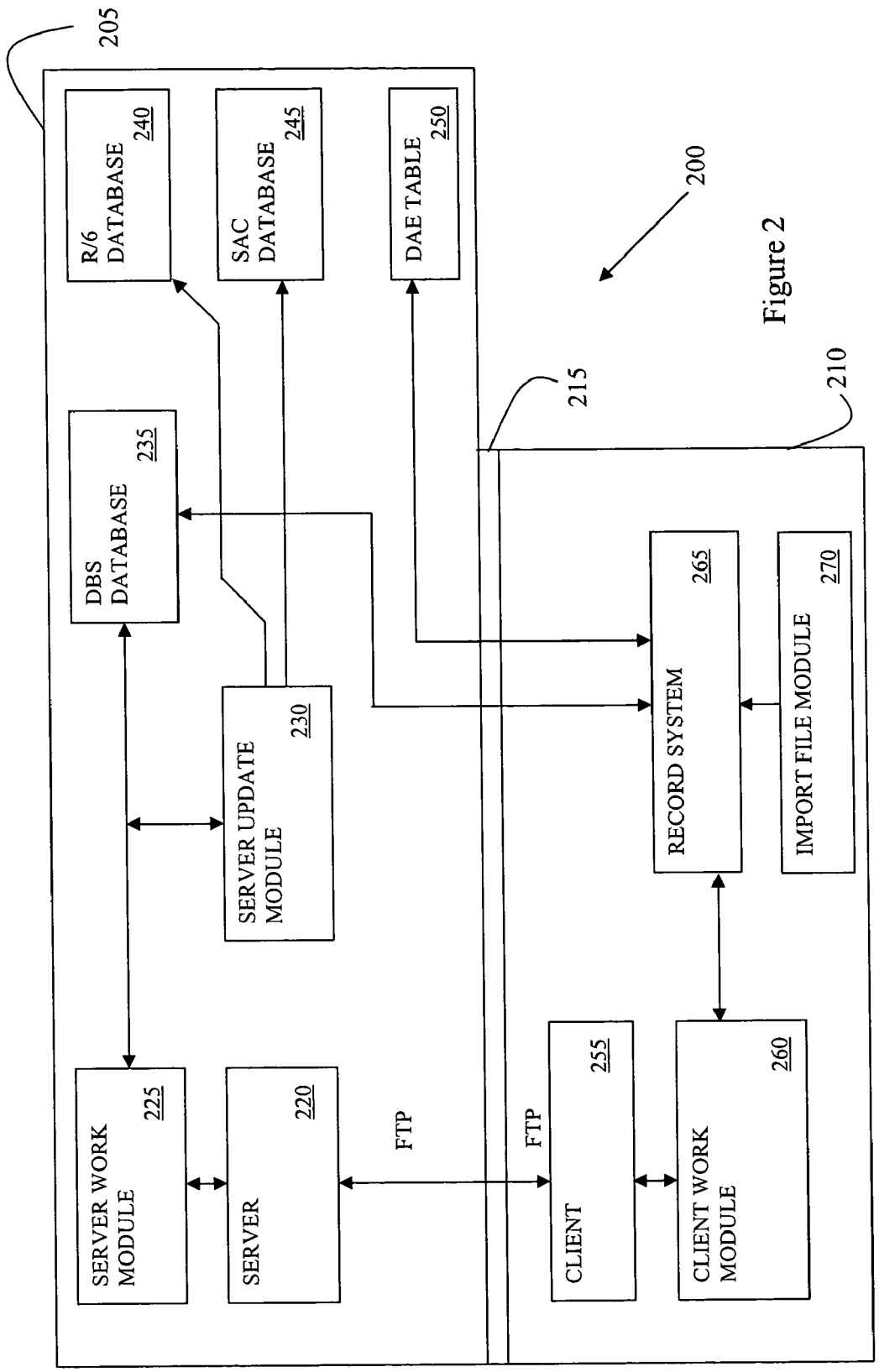
FIG. 2 is a simplified block diagram of a basic record system in accordance with the present invention.

FIG. 2 is a simplified block diagram of a basic record system 200 in accordance with the present invention. The basic record system 200 includes a server module 205 and a client module 210. The server module 205 communicates with the client module 210 via a network 215, e.g., the Internet, that is configured to use the transmission control protocol/Internet protocol (TCP/IP). TCP/IP allows the client module 210 to request and receive information, such as a Web page, from the server module 205. The client module 210 can also transmit information to the server module 205.

File transfer protocol (FTP), a standard Internet protocol, is one way to exchange information, e.g., files, between the server module 205 and the client module 210 over the network 215. FTP is commonly used to download programs and files from the server module 205 to the client module 210. For example, the Web browser on the client module 210 can make FTP requests to download programs and files from the server module 205 that are selected by the user from a Web page. The client module 210 can also use FTP to access and update files that are received from and located at the server module 205.

The server module 205 includes a server 220, a server work module 225, a server update module 230, and a DBS database 235. The database on the server also contains all basic production flow tables, which may exceed 42 tables, including ROUTE, SPEC, RECIPE, ORDER, and PRODUCT tables and so on. An R/6 database 240 contains the updated data once "key tables" have been inserted or updated. "Key tables" as used herein refers to 6 primary tables that will be described further on in the Detailed Description. A SAC database 245 is the database which contains the data that the chart creating system needs, and a DAE table module 250 (manufactured by IBM) stores the data. The server 220 includes a network interface (not shown), which is used to connect the server module 205 to the network 215. The server 220 includes software routines that perform various operations such as connecting to the client 255 and the databases and providing read/write access to the client 255 and the databases. The server 220 may invoke the software routines to access and update the databases and to retrieve data objects from the databases for processing by the server module 205. Preferably, the server 220 is a F2DB AIX computer system with a UNIX operating system.

The server work module 225 is coupled to the server 220 and the DBS database 235. The server work module 225 is used to access, create, store and update server work files. The server work files can include information in the form of a number of tables, which include a number of identifiers and records. The server update module 230 is coupled to the server work module 225, the DBS database 235, the R/6 database 240, and the SAC database 245. The server update module 230 is used to access, create, store and update server update files. The server update files may include information in the form of raw data or in the form of a number of tables, which include a number of identifiers and records.

The databases 235, 240 and 245 may be relational databases where data is organized into tables where the columns represent the fields and the rows or records represent data objects. Each record might have an identifier, which uniquely identifies the record. The user of the relational database may not need to know how the databases are physically constructed to access and update the data in the databases. In one embodiment, the data is accessed and updated using a query-language such as a standard query language (SQL), which is used to create queries to the databases. For example, Microsoft SQL is commercially available relational database software that allows the user to create queries to the databases.

The DAE table module 250 is used for batch record security control. During each data transfer between the server module 205 and the client module 210, the DAE table module 250 monitors the network 215 and the record system 265 to ensure that the data and file transfers are proper.

The client module 210 includes a client 255, a client work module 260, and a record system 265. The client 255 includes a network interface (not shown), which is used to connect the client module 210 to the network 215. In one embodiment, an open database connect (ODBC) network interface can be used by the client module 210 to access and update the databases 235, 240 and 245 over the network 215. For example, Microsoft ODBC is a commercially available network interface that allows the user of the client module 210 to access and update the databases 235, 240 and 245 over the network 215. The client 255 includes software routines that perform various operations such as connecting to the server 220 and the databases and providing read/write access to the server 220 and the databases. The client 255 may invoke the software routines to access and update the databases and to retrieve data objects from the databases for processing by the client module 210. Preferably, the client 255 is a computer system with an OS2 or NT operating system.

The record system 265 is a storage device where data is organized and stored as tables where the columns represent the fields and the rows or records represent data objects. Each record might have an identifier, which uniquely identifies the record. The record system 265 is coupled to the client work module 260, the DBS database 235, and the DAE table module 250. When the client 255 is a computer system with an NT operating system, the record system 265 can be replaced with a B/R batch update system 265. The B/R batch update system 265 is a system that user can update basic record data by batch. In addition, an import file module 270 can be coupled to the record system 265 for creating, generating, opening and storing import files.

Figure 3:
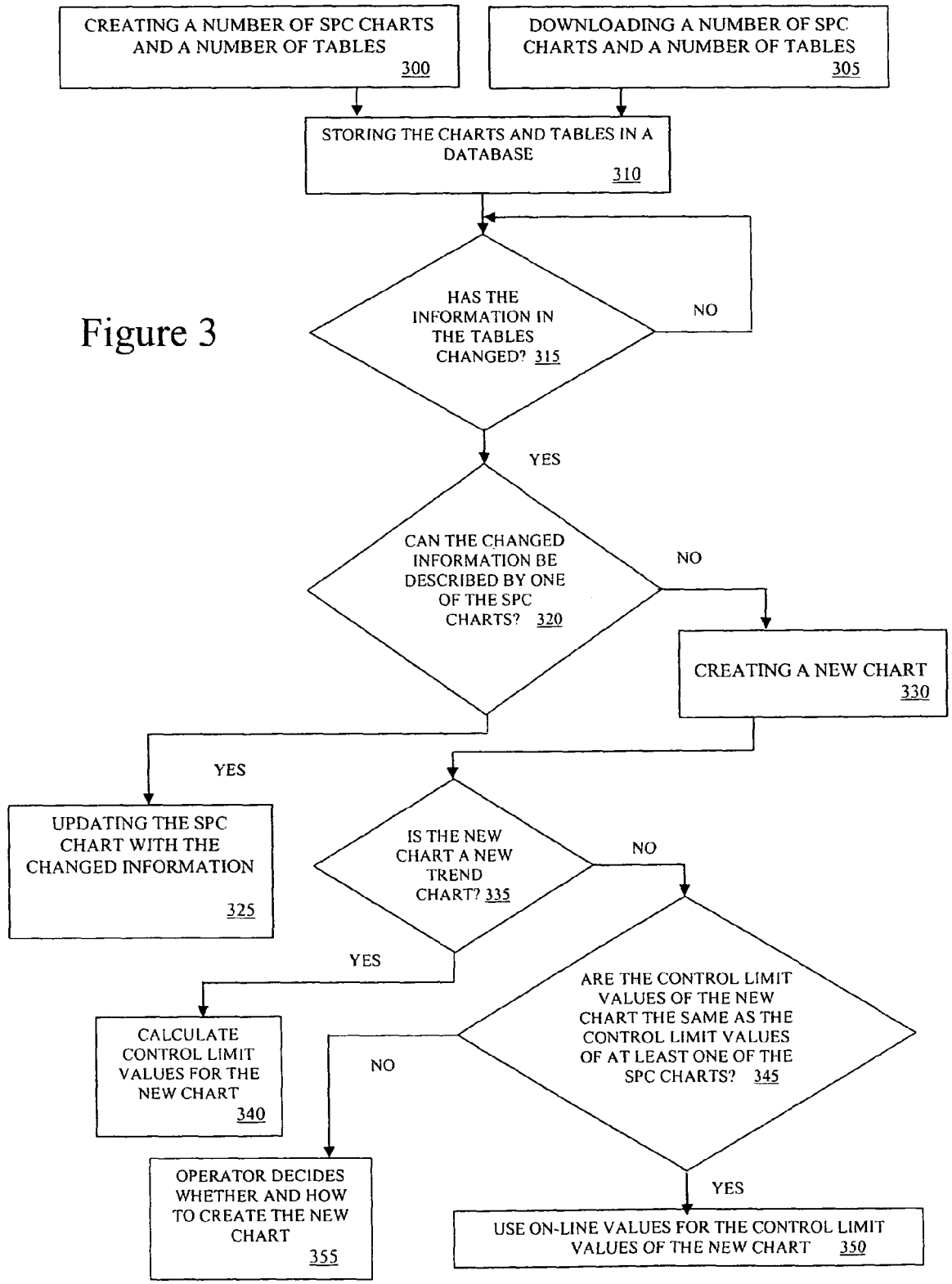
FIG. 3 is a simplified flow chart illustrating a method for creating a control chart for the basic record system of FIG. 2.

FIG. 3 is a simplified flow chart illustrating a method for creating a control chart for the basic record system of FIG. 2. In one embodiment, the method begins with preliminary steps 300, 305 and/or 310. At step 300, an operator or user of the server 220 creates a number of SPC (Statistical Process Control) control charts and a number of optional tables, which can be stored on the DBS database 235. The SPC control charts include information, e.g., process data, to detect abnormal process trends by analyzing statistical patterns and/or behavior. SPC determines the region of normal variation for measurement items, and indicates abnormal operation if the measurements lie outside the accepted operating parameters. Hence, the SPC control charts are created using the information from the tables. After cross analysis, the inventor has determined that there are 6 tables that are directly related to SPC control chart setup. These 6 tables will be referred to as "key tables", as mentioned previously. These "key tables" comprise a primary route table (PROUTE), a sub route table (SROUTE), a tool table (TOOLG), a recipe table (RECIPE), a specification table (SPEC), and a measure field table (MSRFLD). In one embodiment, the operator of the server 220 downloads and updates the basic record tables to the DBS database 235 (step 305). Therefore, the new or updated SPC control charts and the tables can be stored on the basic record system 200 (step 310). Before storing the SPC control charts and the tables on the DBS database 235, the server 220 might verify the format of the SPC control charts and the tables and the accuracy of the information stored in the SPC control charts and the tables.

In accordance with an aspect of the present invention, a determination is made as to whether a new SPC control chart should be generated. As presently embodied, this determination hinges on whether any changes have occurred to information in the basic record system 200. In the illustrated embodiment, after the SPC control charts and the tables are stored on the DBS database 235, the server 220 determines whether the information stored in the tables has been changed in any way (step 315). In accordance with the present invention triggers are defined and set up in the database to automatically create new SPC charts. Triggers can act to update the system once the "key tables" have been inserted or updated. Hence, the server 220 periodically or continually monitors whether any change has occurred to the information in the DBS database 235.

Each time data is updated in the DBS database 235 the interface checks all possible combinations of, for example, tools and recipes to determine whether all of the necessary control charts have been set up in the SPC server. If a control chart has not been created for any of the possible combinations, then the server will automatically set up a control chart for the missing combination unless engineers have already defined the missing combination as not necessary by setting up a "negative table".

FIG. 4 illustrates an example of this process. A collection of control chart factors are shown which include the categories of TOOL, RECIPE, M_FLD, and M_ITEM. Each chart factor has a number of elements. In the illustrated example, there are three TOOL elements, five RECIPE elements, two M_FLD elements, and six M_ITEM elements. These elements can be combined in a total of 180 ways, to form 180 control charts. In the illustrated example a new recipe RECIPE5 has just been added to the database. When the database updates new control charts will be added combining the fields of, for example, TOOL1, RECIPE5, M_FLD1, and M_ITEM1. With the addition of RECIPE5, 36 new control charts will be created.

In one embodiment, the server 220 monitors the database 235 every 60 seconds. Any change to the basic record system 200 might result in the creation of a new control chart, to the extent the existing SPC control charts cannot describe the change. The server 220 periodically determines whether the information stored in the tables has been changed in any way (repeats step 315). Periodically monitoring the DBS database 235 for changes reduces the possibility of missing the creation of a control chart.

Referring back to FIG. 3, if the information has changed, the server 220 determines whether the changes to the information in the tables can be accommodated or described by at least one of the existing SPC control charts stored in the DBS database 235 (step 320). The server can check the main SPC chart creation key, which may comprise tool, recipe, measurement field, and measurement item data. If the existing SPC control charts can accommodate or describe the changes made to the tables, the server 220 updates one or more of the existing SPC control charts with the changed or new information (step 325).

If the changes made to the information cannot be accommodated or described by the existing SPC control charts, the server 220 creates or finds a new control chart (step 330).

At step 335, the server 220 determines whether the new control chart is a new trend chart, which means that the new control chart has not been previously used on tools of the same type as the one that needs (e.g., is associated with) the new control chart. If tools are in the same tool group, they may be of the same type. In other words, same or similar tools and tool types may be used for similar processes. For example, if the new control chart has been previously used on the SPC System by the same type tool, then the new control chart is not a new trend chart. However, if the new control chart has not been previously used on the SPC System by a similar or same tool type, then the new control chart is a new trend chart.

If the new control chart is a new trend chart, the server 220 may calculate control limit values based upon a predetermined function. For example a new tool "FLD01" is added and there are no established control charts that have been defined for similar tools. New control charts are set by using one or more predetermined functions to obtain optimized control limit values (step 340). Examples of the predetermined functions are UCL=Target+(USL−LSL)/4 and LCL=Target−(USL-LSL)/4, where UCL is the upper control limit, LCL is the lower control limit, USL is the upper specification limit, and LSL is the lower specification limit.

If the new control chart is not a new trend chart, the new control chart can be created by following the rules of an SPC control chart established for another tool of the same type or by an operator, wherein, for example, a determination can be made as to whether the control limit values used in the new control chart are the same as the SPC control chart established for the other tool(s) of the same type. Thus, in one implementation, old control limit values used in existing SPC control charts that fit the tools (of the same type as the one used in the new control chart) are used for the new control chart. Alternatively, the operator can be informed of the creation of a new chart to decide whether and how to build the new control chart. In the illustrated embodiment, the server 220 can determine whether the control limit values for the new control chart are or would be the same as the control limit values of at least one of the existing SPC control charts (step 345).

If the control limit values are the same, the server 220 can use on-line values for the control limit values of the new control chart (step 350). The on-line values are retrieved from the DBS database 235 (step 350). The on-line values are the current control values of a similar process for a same or similar tool in the production line. If the control limit values are not the same, the server 220 sends an alarm command to the operator of the server 220 to decide whether and how to create the new control chart (step 355). Because in this situation control values are not all the same, the system may need an operator to confirm or define control values. In one embodiment, the server 220 sends the new control chart and/or the control limit values to the operator of the server 220 to decide whether and how to create the new control chart. The operator might consider whether the control limit values are acceptable for creating the new control chart. If the operator determines that the new control chart should not be created, the operator might add the new control chart and the control limit values to a "negative list", which prevents the new control chart from being created in the future. The "negative list" is stored on the DBS database 235.

The above-described embodiments have been provided by way of example, and the present invention is not limited to these examples. Multiple variations and modification to the disclosed embodiments will occur, to the extent not mutually exclusive, to those skilled in the art upon consideration of the foregoing description. Such variations and modifications, however, fall well within the scope of the present invention as set forth in the following claims.

What is claimed is:

1. A method for creating a new control chart using a computer, the method comprising:
   providing a database including a plurality of statistical process control (SPC) control charts and a plurality of tables;
   determining that information stored in at least one of the plurality of tables has changed;
   determining whether the changed information is describable by at least one of the plurality of SPC control charts;
   updating the at least one of the plurality of SPC control Charts with the changed information using the computer, upon a determination that the changed information is describable by at least one of the plurality of SPC control charts;
   creating a new control chart that can describe the changed information, upon a determination that the changed information cannot be described by at least one of the plurality of SPC control charts;
   determining whether the new control chart is a new trend chart, which is a control chart that has not been previously used on tools of a type that is associated with the new control chart;
   calculating a plurality of control limit values, for the new control chart, when the new control chart is a new trend chart;
   determining whether the control limit values of the new control chart are the same as control limit values of at least one of the plurality of SPC control charts, when the new control chart is not a new trend chart;
   using on-line values for the control limit values of the new control chart, when the control limit values are the same;
   sending a command to the server for determining whether to
   create the new control chart, and what control limit values to set for the new control chart, when the control limit values are not the same; and
   applying the SPC control charts for monitoring production in manufacturing.

2. The method as set forth in claim 1, wherein:
   providing the database includes storing the plurality of SPC control charts and the plurality of tables in the database; and
   the new control chart is created in a basic record system that includes a server coupled to the database.

3. The method as set forth in claim 2, wherein the SPC control charts include information relating to the detection of abnormal process trends from the statistical behavior.

4. The method as set forth in claim 3, wherein:
   the plurality of tables are selected from a group consisting of a primary route table, a sub route table, a tool table, a recipe table, a specification table, a measure field table, and a measure item table; and
   the method further comprises verifying the format of the plurality of SPC control charts and the plurality of tables.

5. The method as set forth in claim 3, wherein the determining that information stored in at least one of the plurality of tables has changed is preceded by a step of determining when information stored in at least one of the plurality of tables has changed and by another step of, when the information has not changed, repeating the step of determining when information stored in at least one of the plurality of tables has changed.

6. The method as set forth in claim 2, wherein the method further comprises calculating a plurality of control limit values for the new trend chart by using one or more predetermined functions to obtain optimized control limit values, when the new control chart is a new trend chart.

7. The method as set forth in claim 6, wherein the one or more predetermined functions are selected from a group consisting of mathematics expressions.

8. The method as set forth in claim 2, further comprising determining whether the control limit values for the new control chart are the same as the control limit values of at least one of the plurality of SPC control charts, when the new control chart is not a new trend chart.

9. The method as set forth in claim 8, wherein each of the plurality of SPC control charts includes a plurality of control limit values.

10. The method as set forth in claim 8, wherein the method further comprises using on-line values for the control limit values of the new control chart, when control limit values for the new control chart are the same as the control limit values of the at least one of the plurality of SPC control charts.

11. The method as set forth in claim 8, wherein the method further comprises sending a command to the server for determining whether to create the new control chart, and what control limit values to set, when the control limit values are not the same.

12. The method as set forth in claim 11, and further comprising adding the new control chart and the plurality of control limit values to a negative list when the new control chart is not created.

13. The method as set forth in claim 1, further comprising verifying the format of the plurality of SPC control charts and the plurality of tables.

14. The method as set forth in claim 1, wherein the new trend chart is defined as a control chart that has not been previously used on tools of a type that is associated with the new control chart.

15. The method as set forth in claim 1, wherein the calculating of a plurality of control limit values uses one or more predetermined functions to obtain optimized control limit values.

16. The method as set forth in claim 15, wherein the one or more predetermined functions are selected from a group consisting of mathematics expressions.

17. The method as set forth in claim 1, further comprising adding the new control chart and the calculated plurality of control limit values to a negative list when the new control chart is not created.

18. A statistical process control (SPC) control chart building method for use with a computer, the method comprising:

checking data stored in a database that stores a plurality of SPC control charts and tables to ascertain whether any of the data has changed;

checking at least one of the plurality of tables and determining whether the changed data is describable by any of the plurality of SPC control charts, when any of the data has changed;

building a new control chart using the computer when the SPC control charts cannot describe the changed data;

determining whether the new control chart is a new trend charts which is a control chart that has not been previously used on tools of a type that is associated with the new control chart;

calculating values of a plurality of control limits of the new control chart using a predetermined function, when the new control chart is a new trend chart;

using on-line values to fit into the control limits of the new control chart, when the new control chart is not a new trend chart and the control limits of the new control chart are the same as the ones in the existing SPC control charts; and generating an alarm, when the new control chart is not a new trend chart and the control limits of the new control chart are not the same as the ones in the existing SPC control charts.

19. The method as set forth in claim 18, wherein the checking and determining are performed automatically.

* * * * *